(12) United States Patent
Itou et al.

(10) Patent No.: US 7,952,662 B2
(45) Date of Patent: May 31, 2011

(54) TRANSFLECTIVE DISPLAY DEVICE

(75) Inventors: Akiko Itou, Uji (JP); Kohzoh Nakamura, Kashiba (JP); Shun Ueki, Nara (JP); Tokio Taguchi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 605 days.

(21) Appl. No.: 11/910,706

(22) PCT Filed: Mar. 28, 2006

(86) PCT No.: PCT/JP2006/306328
§ 371 (c)(1),
(2), (4) Date: Oct. 4, 2007

(87) PCT Pub. No.: WO2006/109567
PCT Pub. Date: Oct. 19, 2006

(65) Prior Publication Data
US 2009/0128752 A1  May 21, 2009

(30) Foreign Application Priority Data

Apr. 5, 2005 (JP) ................................. 2005-109226
Dec. 26, 2005 (JP) ................................. 2005-373539

(51) Int. Cl.
*G02F 1/1335* (2006.01)
(52) U.S. Cl. ........ 349/114; 349/113; 349/106; 349/108; 349/110
(58) Field of Classification Search .................. None
See application file for complete search history.

(56) References Cited

U.S. PATENT DOCUMENTS

| 4,800,375 A * | 1/1989 | Silverstein et al. ........... 345/694 |
| 6,281,952 B1 * | 8/2001 | Okamoto et al. ................ 349/12 |
| 6,919,944 B2 * | 7/2005 | Maeda ........................... 349/113 |
| 2003/0001994 A1 * | 1/2003 | Iino ................................. 349/113 |
| 2004/0027516 A1 * | 2/2004 | Liu ................................. 349/113 |
| 2004/0174389 A1 | 9/2004 | Ben-David et al. |
| 2005/0122294 A1 | 6/2005 | Ben-David et al. |
| 2005/0236950 A1 | 10/2005 | Maeda et al. |
| 2005/0237450 A1 | 10/2005 | Hu et al. |
| 2005/0243048 A1 | 11/2005 | Moriya et al. |
| 2007/0153165 A1 * | 7/2007 | Hu et al. ........................ 349/106 |
| 2007/0252924 A1 | 11/2007 | Haga et al. |
| 2008/0068552 A1 | 3/2008 | Hu et al. |

FOREIGN PATENT DOCUMENTS

JP 09-251160 A 9/1997
(Continued)

OTHER PUBLICATIONS

Official communication issued in the International Application No. PCT/JP2006/306328, mailed on May 16, 2006.
(Continued)

*Primary Examiner* — David Nelms
*Assistant Examiner* — Lucy P Chien
(74) *Attorney, Agent, or Firm* — Keating & Bennett, LLP

(57) ABSTRACT

A transflective display device capable of suppressing white balance from shifting to yellow includes filters of R, G, B, and Y, and a region corresponding to a reflective member in the Y filter is covered with a BM. Therefore, filters used in the reflective display are limited to three colors of R, G, and B, and thereby white balance can be prevented from shifting to yellow.

6 Claims, 7 Drawing Sheets

FOREIGN PATENT DOCUMENTS

| | | |
|---|---|---|
| JP | 2001-209047 A | 8/2001 |
| JP | 2001-306023 A | 11/2001 |
| JP | 2002-365421 A | 12/2002 |
| JP | 2003-163940 A | 6/2003 |
| JP | 2003-233063 A | 8/2003 |
| JP | 2004-258616 A | 9/2004 |
| JP | 2005-234133 A | 9/2005 |
| JP | 2005-309305 A | 11/2005 |
| JP | 2005-338783 A | 12/2005 |
| JP | 2006-106437 A | 4/2006 |
| TW | 200415410 A | 8/2004 |
| TW | 200535529 A | 11/2005 |
| WO | 2004/042687 A | 5/2004 |

OTHER PUBLICATIONS

Yang et al.; "Development of Six Primary-Color LCD"; SID 05 Digest; May 25, 2005; pp. 1210-1213.

Chino et al.; "Development of Wide-Color-Gamut Mobile Displays With Four-Primary-Color LCDs"; SID 06 Digest; Jun. 7, 2006; pp. 1221-1224.

Ben-Chorin; "Improving LCD TV Color Using Multi-Primary Technology"; Genoa Color Technologies; Flat Panel Display; International 2005 Forum; Oct. 19, 2005; pp. 1-53.

\* cited by examiner

TRANSFLECTIVE DISPLAY DEVICE

BACKGROUND OF THE INVENTION

1. Field of the Invention

The present invention relates to transflective display devices which display an image in both of a transmissive region and a reflective region.

2. Description of the Related Art

Liquid crystal display devices have been widely used in electronic devices such as a monitor, a projector, a cellular phone, a personal digital assistance (hereinafter, referred to as PDA), recently.

Such liquid crystal display devices are classified into reflective, transmissive, and transflective types. The reflective liquid crystal display devices guide surrounding light to the inside of a liquid crystal panel, and reflect this light by a reflective member, thereby obtaining display light.

The transmissive liquid crystal display devices are configured to emit light from a light source (hereinafter, referred to backlight) disposed on the back of a liquid crystal panel through the liquid crystal panel.

According to the transflective liquid crystal display devices, transmissive display using light from the backlight is mainly observed under relatively dark environments such as an indoor environment. Under relatively bright environments such as an outdoor environment, a reflective display using surrounding light is mainly observed. As a result, a display with a high contrast ratio can be provided regardless of surrounding brightness.

That is, the transflective liquid crystal display devices can provide display under all environments regardless of indoor and outdoor environments, and therefore such devices have been often equipped with mobile devices such as a cellular phone, a PDA, and a digital camera.

According to such transflective liquid crystal display devices, the liquid crystal panel has two different display regions: a reflective region; and a transmissive region.

In the transmissive region, light from a backlight is passed through a liquid crystal layer and a color filter only one time and then emitted.

In the reflective region, surrounding light transmitted through the color filter and the liquid crystal layer is reflected by a reflective member and passed through the liquid crystal layer and the color filter again, and then emitted.

Thus, the transmissive region and the reflective region use different light sources, that is, backlight and surrounding light, thereby generating display light.

A color filter used in a conventional liquid crystal display device includes three primary colors of RGB (red, green, and blue) (hereinafter, referred to as three-color filter). However, by using only these three primary colors, a color reproduction range is not sufficiently extended. Therefore, not all colors which can be recognized by human eyes can be expressed.

Four or more-color filters have been proposed in order to extend the color reproduction range and improve use efficiency of light.

For example, Patent Document 1 (Japanese Kokai Publication 2001-209047 (day of publication: Aug. 3, 2001)) discloses a color filter including four colors of RGBY in which Y (yellow) is added to the three primary colors of RGB (hereinafter, also referred to as four-color filter). With respect to this RGBY, R and G, and B and Y, are mutually opposite, respectively, and such combinations are complementary color combinations based on human visual characteristics.

[Non-patent Document 1] MacCamy, C. S., Correlated Color Temperature As An Explicit Function of Chromaticity Coordinates, Color Res. Appl. 17, 142-144 (1992).

White balance is mentioned as one important display performance characteristic of display devices. This white balance is a hue of white displayed by a display device, and mainly determined by a color tone of a light source and a configuration of a color filter.

An LED or a CCFT (cold cathode fluorescent tube) having an emission peak to a spectrum transmittance of a three-color filter is generally used as a backlight of liquid crystal display devices.

However, use of the above-mentioned four-color filter in a transflective liquid crystal display device largely affects the white balance, although a luminance or a color reproduction range can be improved.

That is, if the four-color filter is used as a color filter in a liquid crystal display device including a backlight corresponding to the three-color filter, the color tone of the white balance is shifted to yellow.

The white balance in the transmissive display can be improved by adjusting the color tone of the backlight.

In the reflective display using surrounding light, however, it can be impossible to adjust the color tone of the light source and therefore it is difficult to suppress the white balance from shifting to yellow.

The adjustment of the color tone of the backlight causes a large difference in white balance between the transmissive display and the reflective display.

It can be possible that the white balance of the display device is previously adjusted by four colors of RGBY in such a way that optimum white balance can be obtained when surrounding light is used.

However, a B filter needs to have an extremely thin thickness for such adjustment. Even if the B filter has a thin thickness, white balance which is absolutely not shifted to yellow can not be obtained.

This adjustment also causes a large difference between a display color and a color obtained using the three-color filter in accordance with NTSC.

SUMMARY OF THE INVENTION

In order to overcome the problems described above, preferred embodiments of the present invention provide a transflective display device capable of reducing differences in color tone such as white balance between the transmissive display and the reflective display.

The present inventors made various investigations of transflective display devices capable of reducing differences in color tone such as white balance between the transmissive display and the reflective display, and noted filters used in the transmissive region and the reflective region. The inventors found that the difference in color tone of the white balance between the transmissive display and the reflective display is attributed to that filters of the same color are used in the transmissive region and the reflective region in conventional transflective display devices. The inventors also discovered that the differences in color tone of the white balance between the transmissive display and the reflective display can be reduced if the color number of filters in the transmissive regions is different from that in the reflective regions. As a result, the above-mentioned problems have been advantageously solved, leading to development of preferred embodiments of the present invention.

That is, the present invention is a transflective display device including transmissive regions for displaying an image by transmitting light of a backlight and reflective regions for displaying an image by reflecting surrounding light, wherein the transflective display device includes a color filter including filters of a plurality of colors; and a color number of the filters in the transmissive regions is different from a color number of the filters in the reflective regions (hereinafter, also referred to as a first display device according to a preferred embodiment of the present invention).

Another preferred embodiment of the present invention provides a transflective display device capable of performing transmissive display for displaying an image by transmitting light of a backlight and performing reflective display for displaying an image by reflecting surrounding light, wherein the transflective display device includes a color filter including filters of a plurality of colors; and a color number of the filters used for the transmissive display is different from a color number of the filters used for the reflective display (hereinafter, also referred to as a second display device according to a preferred embodiment of the present invention).

The first display device according to a preferred embodiment of the present invention includes a transmissive region for displaying an image by transmitting light of a backlight and a reflective region for displaying an image by reflecting surrounding light. The second display device according to a preferred embodiment of the present invention can perform transmissive display for displaying an image by transmitting light of a backlight and reflective display for displaying an image by reflecting surrounding light. That is, the display device according to preferred embodiments of the present invention is a transflective display device and performs transmissive display using light of a backlight in the transmissive region and performs reflective display using surrounding light in the reflective region.

The display device according to preferred embodiments of the present invention includes a color filter having filters of a plurality of colors.

Therefore, the display device can perform color display. The array pattern of the filters is not especially limited, and examples thereof include a stripe pattern, delta pattern, mosaic pattern. The material of the filters is not especially limited and examples thereof include a resin stained by a dye, a resin into which a pigment is dispersed, a material obtained by solidifying a fluid material into which a pigment is dispersed. The fluid material is generally called ink. The method of forming the filters is not especially limited and examples thereof include a dyeing method, a pigment dispersion method, an electrodeposition method, a printing method, and an ink-jet method.

According to the display device according to preferred embodiments of the present invention, a black matrix (BM) may be disposed between the filters in order to prevent light leakage between the filters. If the filters are formed by an ink-jet method, a printing method, and the like, a projective structure (bank) may be disposed between the filters to prevent mixing of inks with different colors.

In this description, the filter selectively transmits visible light within a specific wavelength range more than visible light with other wavelengths. Filters having a transmittance uniform for all wavelengths of visible light are not included as the filter. The filters of a plurality of colors are not especially limited, but filters of three or more colors are preferable in terms of expansion of the color reproduction range. For example, three primary colors of R (red), G (green), and B (blue), four colors of R, G, B, and Y (yellow) or C (cyan), five colors of R, G, B, Y, and C, and six colors of R, G, B, Y, C, and magenta (M) are mentioned.

In this description, the red is a color having a main wavelength of 597 nm or more and 780 nm or less in an xy chromaticity diagram in an XYZ color system, and preferably 600 nm or more and 620 nm or less; the yellow is a color having a main wavelength of 558 nm or more and less than 597 nm, and preferably 570 nm or more and 582 nm or less; the green is a color having a main wavelength of 510 nm or more and less than 558 nm, and preferably 520 nm or more and 557 nm or less; the cyan is a color having a main wavelength of 488 nm or more and less than 510 nm, and preferably 493 nm or more and 503 nm or less; and the blue is a color having a main wavelength of 380 nm or more and less than 488 nm, and preferably 455 nm or more and 475 nm or less.

According to the first display device of a preferred embodiment of the present invention, the color number of the filters in the transmissive regions is different from that in the reflective regions. According to the second display device of a preferred embodiment of the present invention, the color number of the filters used for the transmissive display is different from that used for the reflective display. According to these, filters suitable for the transmissive display and those suitable for the reflective display are formed in the transmissive regions and the reflective regions, respectively. As a result, differences in color tone such as white balance between the transmissive display and the reflective display can be reduced.

The configuration of the display device according to preferred embodiments of the present invention is not especially limited and may or may not other components as long as it essentially includes the above-mentioned components.

Preferred embodiments of the display device according to the present invention are described below in more detail.

With respect to the first display device of a preferred embodiment of the present invention, a preferred embodiment in which the color number of the filters in the transmissive regions is larger than the color number of the filters in the reflective regions may be mentioned. With respect to the second display device of a preferred embodiment of the present invention, a preferred embodiment in which the color number of the filters used for the transmissive display is larger than the color number of the filters used for the reflective display may be mentioned. According to these preferred embodiments, the color reproduction range in the transmissive display can be extended and the white balance in the transmissive display can be optimally adjusted because the color number of the filters used for the transmissive display is larger.

Among such preferred embodiments, it is preferable that the color number of the filters in the transmissive regions is 4 and the color number of the filters in the reflective regions is 3. As a result, an increase in the color number of the filters can be kept to a minimum, and simultaneously display quality in the transmissive display can be improved.

More specifically, it is preferable in the first display device according to preferred embodiments of the present invention that the filters in the transmissive regions are a red filter, a green filter, a blue filter, and a yellow filter; and the filters in the reflective regions are a red filter, a green filter, and a blue filter. It is preferable in the second display device of a preferred embodiment of the present invention that the filters used for the transmissive display are a red filter, a green filter, a blue filter, and a yellow filter; and the filters used for the reflective display area red filter, a green filter, and a blue filter. If the filters used for the reflective display are limited to three colors of R, G, and B, the white balance in the reflective display can be prevented from being shifted to yellow. The white balance in the transmissive display can be prevented from being shifted to yellow by appropriately adjusting a color temperature of a light source used as a backlight, a thickness of a liquid crystal layer (hereinafter, also referred to as cell thickness) in the transmissive region, and the like. Accordingly, differences in color tone between the transmissive display and the reflective display can be effectively reduced. In addition, the color reproduction range in the transmissive display can be extended because the filters of four colors are formed in the transmissive regions.

With respect to the first display device of a preferred embodiment of the present invention, a preferred embodiment in which a color number of the filters in the reflective regions is larger than a color number of the filters in the transmissive regions. With respect to the second display device of a preferred embodiment of the present invention, a preferred embodiment in which the color number of the filters used for the reflective regions is larger than the color number of the filters used for the transmissive regions may be mentioned. According to these preferred embodiments, the color reproduction range in the reflective display can be extended and the white balance in the reflective display can be optimally adjusted if the color number of the filters used for the reflective display is larger.

Among such preferred embodiments, it is preferable that the color number of the filters in the transmissive regions is 4 and the color number of the filters in the reflective regions is 5. As a result, an increase in the color number of the filters can be kept to a minimum, and simultaneously display quality in the reflective display can be improved.

More specifically, it is preferable in the first display device according to a preferred embodiment of the present invention that the filters in the transmissive regions are a red filter, a green filter, a blue filter, and a yellow filter, and the filters in the reflective regions are a red filter, a green filter, and a blue filter, a yellow filter, and a cyan filter. It is preferable in the second display device according to a preferred embodiment of the present invention that the filters used for the transmissive display are a red filter, a green filter, a blue filter, and a yellow filter; and the filters used for the reflective display are a red filter, a green filter, a blue filter, a yellow filter, and a cyan filter. If a cyan filter which more transmits a component of blue that is a complementary color of yellow is added to the filters used in the reflective display, the white balance in the reflective display can be prevented from being shifted to yellow.

The preferred embodiments of the first display device of the present invention include a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, a region where a reflective member for reflecting surrounding light is formed is shaded by a shading member (hereinafter, referred to as "first preferred embodiment"). Preferred embodiments of the present invention also include such a transflective display device including transmissive regions for displaying an image by transmitting light of a backlight and reflective regions for displaying an image by reflecting surrounding light, wherein the transflective display device includes a color filter including filters of a plurality of colors; the filters in the transmissive regions are a red filter, a green filter, a blue filter, and a yellow filter; the filters in the reflective regions are a red filter, a green filter, and a blue filter; and in a pixel including the yellow filter in the transmissive region, a region where a reflective member for reflecting surrounding light is formed is shaded by a shading member.

The reflective display is performed using light of three primary colors of RGB if the region where a reflective region is generally formed is shaded by a shading member in a pixel including the yellow filter. As a result, the white balance in the reflective display can be prevented from shifting to yellow.

A BM generally disposed between the filters can be used as the shading member, and therefore the display device in accordance with the first preferred embodiment can be easily produced without complicating the production steps.

In this description, the shading member is a member which substantially perfectly blocks visible light and has a transmittance of less than about 0.1% for light with a wavelength of about 400 nm to about 700 nm. Such a member is different from the filters which selectively transmit visible light with a specific wavelength range. The material of the shading member is not especially limited, and examples thereof include an acrylic resin into which a black pigment is dispersed. The black pigment is note specially limited, and carbon particles, chromium or titanium black pigment may be used.

The above-mentioned reflective member is preferably formed in the reflective regions of the other pixels, in addition to the region shaded by the shading member in the pixel including the yellow filter. The material of the reflective member is not especially limited as long as it has a function of reflecting light, and examples thereof include aluminum (Al), silver (Ag), or an alloy of these metals.

The reflective member may function as an electrode. Such a reflective member having the functions of an electrode is also called reflective electrode. If the reflective member does not function as an electrode, it is preferable that an electrode is additionally formed in the regions where the reflective members are disposed.

The reflective member may have a projective surface, thereby providing light-scattering properties, or may have a mirror surface. It is preferable that a light-scattering layer is additionally formed if the reflective member has a mirror surface. This light-scattering layer may be used together with the light-scattering properties of the reflective member.

In this description, the pixel is preferably defined as a region including a filter of one color, that is, a sub-pixel, although the pixel is a minimum display unit of an image and, in color display, generally means a region where filters of all colors are formed one each, for example, an RGB region and an RGBY region.

Accordingly, the display device in accordance with the first preferred embodiment preferably includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the shading member is formed in the region where the reflective member is formed (referred to as Y pixel).

Another preferred embodiment of the first display device of the present invention is a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, a reflective member for reflecting surrounding light is not formed (hereinafter, referred to as a "second preferred embodiment"). Preferred embodiments of the present invention also include such a transflective display device including transmissive regions for displaying an image by transmitting light of a backlight and reflective regions for displaying an image by reflecting surrounding light, wherein the transflective display device includes a color filter including filters of a plurality of colors; the filters in the transmissive regions are a red filter, a green filter, a blue filter, and a yellow filter; the filters in the reflective regions are a red filter, a green filter, and a blue filter; and in a pixel including the yellow filter in the transmissive region, a reflective member for reflecting surrounding light is not formed.

The reflective display is performed using light of three primary colors of RGB if the reflective member is not formed in the region where a reflective region is generally formed in the pixel including the yellow filter. As a result, the white balance in the transmissive display can be prevented from shifting to yellow.

The display device in the second preferred embodiment can be easily produced by just not forming the reflective member in the pixel including the yellow filter.

In addition, the display device in accordance with the second preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region (referred to as Y pixel).

Another preferred embodiment of the first display device of the present invention is a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, the achromatic film is formed in the reflective region (hereinafter, also referred to as a "third preferred embodiment"). Preferred embodiments of the present invention include a transflective display device including transmissive regions for displaying an image by transmitting light of a backlight and reflective regions for displaying an image by reflecting surrounding light, wherein the transflective display device includes a color filter including filters of a plurality of colors and an achromatic film; the filters in the transmissive regions are a red filter, a green filter, a blue filter, and a yellow filter; the filters in the reflective regions are a red filter, a green filter, and a blue filter; and in a pixel including the yellow filter in the transmissive region, the achromatic film is formed in the reflective region.

The reflective display is performed using light of three primary colors of RGB if the achromatic film is formed in the reflective region in the pixel including the yellow filter.

As a result, the white balance in the reflective display can be prevented from shifting to yellow.

In this description, the achromatic film is a film made of a resin which non-selectively transmits visible light, and its transmittance is not especially limited. Such an achromatic film is different from the filters which selectively transmit visible light with a specific wavelength range. Accordingly, the above-mentioned shading member, below-mentioned substantially transparent and colorless resin film and gray film are included in the achromatic film. The material of the achromatic film is not especially limited, and examples thereof include an acrylic resin into which a black pigment is dispersed. The black pigment is not especially limited, and carbon particles, chromium or titanium black pigment may be mentioned.

Accordingly, the transmittance of the achromatic film can be appropriately adjusted, and thereby the reflective display can be performed using not only light of three colors of RGB but also light transmitted through the achromatic film. As a result, the luminance in the reflective display can be easily adjusted to a desired luminance. Examples of a method of adjusting the transmittance of the achromatic film include a method of controlling the content of the black pigment dispersed into the resin.

The display device in accordance with the third preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the achromatic film is formed in the reflective region (referred to as Y pixel).

Another preferred embodiment of the first display device of the present invention is a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, the substantially transparent and colorless resin film is formed in the reflective region (hereinafter, also referred to as a "fourth preferred embodiment"). Preferred embodiments of the present invention also include such a transflective display device including transmissive regions for displaying an image by transmitting light of a backlight and reflective regions for displaying an image by reflecting surrounding light, wherein the transflective display device includes a color filter including filters of a plurality of colors and a substantially transparent and colorless resin film; the filters in the transmissive regions are a red filter, a green filter, a blue filter, and a yellow filter; the filters in the reflective regions are a red filter, a green filter, and a blue filter; and in a pixel including the yellow filter in the transmissive region, the substantially transparent and colorless resin film is formed in the reflective region.

The reflective display is performed using light of three primary colors of RGB if the substantially transparent and colorless resin film is formed in the reflective region in the pixel including the yellow filter. As a result, the white balance in the reflective display can be prevented from shifting to yellow.

The luminance in the reflective display can be improved because the reflective display is performed using not only light of three colors of RGB but also light transmitted through the substantially transparent and colorless resin film. The reflectance in the reflective region is changed depending on the reflective member forming the reflective region in the pixel including the yellow filter in the transmissive region, and therefore, an arbitrary luminance can be obtained. Metals having a broad reflectance within a range of visible light are preferable as the reflective member, and examples thereof include aluminum, chromium, and tungsten.

In this description, the substantially transparent and colorless resin film preferably is a film made of a resin which substantially perfectly transmits visible light and has a transmittance of larger than approximately 90% for light with a wavelength of about 400 nm to about 700 nm. Such a film is different from the filters which selectively transmit visible light with a specific wavelength range.

The material of the resin film is not especially limited as long as it is substantially transparent and colorless, and an acrylic resin and the like may be mentioned.

The display device in accordance with the fourth preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the substantially transparent and colorless resin film is formed in the reflective region (referred to as Y pixel).

The above-mentioned effects can be obtained even in a configuration in which the transparent and colorless resin film is not formed and just an opening is formed in the color filter, instead of forming the substantially transparent and colorless resin film is formed in the reflective region in the Y pixel.

However, the opening may cause defect in cell thickness and the like.

Another preferred embodiment of the first display device of the present invention includes a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, the gray film is formed in the reflective region (hereinafter, referred to as a "fifth preferred embodiment"). Preferred embodiments of the present invention also include a transflective display device including transmissive regions for displaying an image by transmitting light of a backlight and reflective regions for displaying an image by reflecting surrounding light, wherein the transflective display device includes a color filter including filters of a plurality of colors and a gray film; the filters in the transmissive regions are a red filter, a green filter, a blue filter, and a yellow filter; the filters in the reflective regions are a red filter, a green filter, and a blue filter; and in a pixel including the yellow filter in the transmissive region, the gray film is formed in the reflective region.

The reflective display is performed using light of three primary colors of RGB if the gray film is formed in the reflective region in the pixel including the yellow filter. As a result, the white balance in the reflective display can be prevented from shifting to yellow.

The reflective display can be performed using not only light of three colors of RGB but also light transmitted through the gray film. Therefore, the reflective display with a desired luminance can be performed by adjusting the transmittance of the gray film.

In this description, the gray film is a film made of a resin which non-selectively transmits visible light and has a transmittance of about 0.1% or more and about 90% or less for light with a wavelength of about 400 nm to about 700 nm. Such a gray film is different from the filters which selectively transmit visible light with a specific wavelength range. The material of the gray film is not especially limited, and an acrylic resin into which a black pigment is dispersed may be mentioned. The black pigment is not especially limited, and carbon particles, chromium or titanium black pigment may be mentioned.

Examples of a method of adjusting the transmittance of the gray film include a method of controlling the content of the black pigment dispersed into the resin. As a result, the luminance in the reflective display can be easily adjusted.

The display device in accordance with the fifth preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the gray film is formed in the reflective region (referred to as Y pixel).

Another preferred embodiment of the first display device of the present invention is a preferred embodiment in which filters in the transmissive regions are a red filter, a green filter, a blue filter, and a yellow filter; filters in the reflective regions are a red filter, a green filter, and a blue filter; and in a pixel including the yellow filter in the transmissive region, achromatic light is emitted through the reflective region (hereinafter, referred to as a "sixth preferred embodiment"). Preferred embodiments of the present invention also include such a transflective display device including transmissive regions for displaying an image by transmitting light of a backlight and reflective regions for displaying an image by reflecting surrounding light, wherein the transflective display device includes a color filter including filters of a plurality of colors; the filters in the transmissive regions are a red filter, a green filter, a blue filter, and a yellow filter; the filters in the reflective regions are a red filter, a green filter, and a blue filter; and in a pixel including the yellow filter in the transmissive region, achromatic light is emitted through the reflective region.

The reflective display is performed using light of three primary colors of RGB if achromatic light is emitted through the reflective region in the pixel including the yellow filter. As a result, the white balance in the reflective display can be prevented from shifting to yellow.

The reflective display is performed using not only light of three colors of RGB and the achromatic light. Therefore, the reflective display with a desired luminance can be performed by adjusting the amount of the achromatic light.

The display device in accordance with the sixth preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region (referred to as Y pixel).

The above-mentioned first to sixth preferred embodiments can be applied to the second display device of the present invention. For example, the second display device according to preferred embodiments of the present invention include a preferred embodiment (a) in which in the pixel using the yellow filter for the transmittance display, the region where the reflective member for reflecting surrounding light is formed is shaded by the shading member; or (b) in which in the pixel using the yellow filter for the transmissive display, the reflective member for reflecting surrounding light is not formed.

Preferable embodiments of the second display device of the present invention include a preferred embodiment in which filters used for the transmissive display are a red filter, a green filter, a blue filter, and a yellow filter; filters used for the reflective display are a red filter, a green filter, and a blue filter; and a pixel using the yellow filter for the transmissive display performs the reflective display without using filters of any colors (hereinafter, referred to as a "seventh preferred embodiment"). Preferred embodiments of the present invention also include such a transflective display device capable of performing transmissive display for displaying an image by transmitting light of a backlight and performing reflective display for displaying an image by reflecting surrounding light, wherein the transflective display device includes a color filter including filters of a plurality of colors; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display without using filters of any colors.

The reflective display is performed using light of three primary colors of RGB if filters of any colors are not arranged in the region used for the reflective display in the pixel including the yellow filter. As a result, the white balance in the transmissive display can be prevented from shifting to yellow.

The above-mentioned display device in accordance with the seventh preferably embodiment preferably includes preferred embodiments (1) in which a pixel using the yellow filter for the transmissive display performs the reflective display using light transmitted through the achromatic film; (2) in which a pixel using the yellow filter for the transmissive display performs the reflective display using light transmitted through the substantially transparent and colorless resin film; (3) in which a pixel using the yellow filter for the transmissive display performs the reflective display using light transmitted through the gray film; or (4) in which a pixel using the yellow filter for the transmissive display performs the reflective display using achromatic light.

That is, the preferred embodiments of the present invention also include a transflective display device capable of performing transmissive display for displaying an image by transmitting light of a backlight and performing reflective display for displaying an image by reflecting surrounding light, wherein the transflective display device includes a color filter including filters of a plurality of colors and an achromatic film; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display using light transmitted through the achromatic film, as in the above-mentioned first preferred embodiment.

Preferred embodiments of the present invention also include a transflective display device capable of performing transmissive display for displaying an image by transmitting light of a backlight and performing reflective display for displaying an image by reflecting surrounding light, wherein the transflective display device includes a color filter including filters of a plurality of colors and a substantially transparent and colorless resin film; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display using light transmitted through the substantially transparent and colorless resin film, as in the above-mentioned second preferred embodiment.

Preferred embodiments of the present invention also include a transflective display device capable of performing transmissive display for displaying an image by transmitting light of a backlight and performing reflective display for displaying an image by reflecting surrounding light, wherein the transflective display device includes a color filter including filters of a plurality of colors and a gray film; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display using light transmitted through the gray film, as in the above-mentioned third preferred embodiment.

Preferred embodiments of the present invention also include a transflective display device capable of performing transmissive display for displaying an image by transmitting light of a backlight and performing reflective display for displaying an image by reflecting surrounding light, wherein the transflective display device includes a color filter including filters of a plurality of colors; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display using achromatic light, as in the above-mentioned preferred embodiment.

In the above-mentioned first preferred embodiment, the reflective display is performed using light of three primary colors of RGB if the achromatic film is formed in the reflective region in the pixel including the yellow filter.

As a result, the white balance in the transmissive display can be prevented from shifting to yellow.

Further, the transmittance of the achromatic film is adjusted, and thereby the reflective display is performed using not only light of three colors of RGB but also light transmitted through the achromatic film. Therefore, the reflective display with a desired luminance can be performed.

The display device of the above-mentioned first preferred embodiment in accordance with the seventh preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the achromatic film is formed in the reflective region (referred to as Y pixel).

In the above-mentioned second preferred embodiment, the reflective display is performed using light of three primary colors of RGB if the substantially transparent and colorless resin film is formed in the reflective region in the pixel including the yellow filter. As a result, the white balance in the reflective display can be prevented from shifting to yellow.

The luminance in the reflective display can be improved because the reflective display is performed using not only light of three colors of RGB but also light transmitted through the substantially transparent and colorless resin film.

The display device of the above-mentioned second preferred embodiment in accordance with the seventh preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the substantially transparent and colorless resin film is formed in the reflective region (referred to as Y pixel).

In the above-mentioned third preferred embodiment, the reflective display is performed using light of three primary colors of RGB if the gray film is formed in the reflective region in the pixel including the yellow filter. As a result, the white balance in the transmissive display can be prevented from shifting to yellow.

The reflective display is performed using not only light of three primary colors of RGB but also light transmitted through the gray film. Accordingly, the reflective display with a desired luminance can be performed by adjusting the transmittance of the gray film.

The display device of the above-mentioned third preferred embodiment in accordance with the seventh preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the gray film is formed in the reflective region (referred to as Y pixel).

In the above-mentioned the fourth preferred embodiment, the reflective display is performed using light of three primary colors of RGB if the reflective display is performed using achromatic light in the pixel including the yellow filter. As a result, the white balance in the transmissive display can be prevented from shifting to yellow. The reflective display is performed using not only light of three colors of RGB but also achromatic light. Accordingly, the reflective display with a desired luminance can be performed by adjusting the amount of the achromatic light.

The display device of the above-mentioned fourth preferred embodiment in accordance with the seventh preferred embodiment includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region (referred to as Y pixel).

The above-mentioned seventh preferred embodiment can be applied to the first display device according to a preferred embodiment of the present invention.

The present invention also includes a transflective display device including transmissive regions for displaying an image by transmitting light of a backlight and reflective regions for displaying an image by reflecting surrounding light, wherein the transflective display device includes a color filter including filters of a plurality of colors and a stacked film of a yellow filter and a blue filter; the filters in the transmissive regions are a red filter, a green filter, a blue filter, and a yellow filter; the filters in the reflective regions are a red filter, a green filter, and a blue filter; and in a pixel including the yellow filter in the transmissive region, the yellow filter and the blue filter are stacked in the reflective region (hereinafter, also referred to as third display device according to a preferred embodiment of the present invention).

Further, preferred embodiments of the present invention provide a transflective display device capable of performing transmissive display for displaying an image by transmitting light of a backlight and performing reflective display for displaying an image by reflecting surrounding light, wherein the transflective display device includes a color filter including filters of a plurality of colors and a stacked film of a yellow filter and a blue filter; the filters used for the transmissive display are a red filter, a green filter, a blue filter, and a yellow filter; the filters used for the reflective display are a red filter, a green filter, and a blue filter; and a pixel using the yellow filter for the transmissive display performs the reflective display using light transmitted through a region where the yellow filter and the blue filter are stacked (hereinafter, also referred to as fourth display device according to a preferred embodiment of the present invention).

If the yellow filter and the blue filter (hereinafter, also referred to as achromatizing blue filter) are stacked in the reflective region of the pixel including the yellow filter in the transmissive region and the reflective region, the reflective region is shaded (A in FIG. 13) or achromatic light is emitted through the reflective region (B in FIG. 13) because of the yellow filter and the blue filter, as shown in FIG. 13, because yellow and blue are mutually opposite. As a result, the reflective display is performed using light of three primary colors of RGB and the white balance in the reflective region can be prevented from shifting to yellow. FIG. 13 shows a transmission spectrum of light transmitted through the stacked film of the yellow filter and the achromatizing blue filter. "A" in the figure shows a transmission spectrum of light shaded by a stacked film of a yellow filter having a transmission spectrum of A-y and an achromatizing blue filter having a transmission spectrum of A-b. "B" in the figure shows a transmission spectrum of achromatic light which is transmitted through a stacked film of a yellow filter showing a transmission spectrum of B-y and an achromatizing blue filter showing a transmission spectrum of B-b and then emitted. The stacked film used in B is formed by thinning each of the yellow filter and the achromatizing blue filter of the stacked film used in A.

The reflective display is performed using not only light of three colors of RGB but also light transmitted through the region where the yellow filter and the blue filter are stacked by adjusting the transmittance of the region where the yellow filter and the blue filter are stacked. Accordingly, the reflective display with a desired luminance can be performed.

According to the third or fourth display device according to a preferred embodiment of the present invention, a filter having a transmission spectrum in the visible range, not overlapping with that of the yellow filter, is preferable as the achromatizing blue filter, and a bluish transparent resin film and the like may be used, for example. The achromatizing blue filter may be made of the same material as for the blue filer in the B pixel. If the same material as that for the blue filter of the B pixel is used, the achromatizing blue filter can be simultaneously formed when the blue filter in the B pixel is formed. Further, the achromatizing blue filter may be formed by coloring a transparent resin film (multi-gap layer) which is formed to make the liquid crystal layer in the reflective region thinner than the liquid crystal layer in the transmissive region, in blue.

The yellow filter and the achromatizing blue filter may be disposed to be directly connected to each other, or may be disposed to be spaced to each other. If they are directly connected to each other, it is preferable that the film thickness of the stacked film of the yellow filter and the achromatizing blue filter is substantially the same as that of each of the red filter, the green filter, and the blue filter.

The third or fourth display device according to a preferred embodiment of the present invention includes an R pixel where the red filter is formed in the transmissive region and the reflective region, a G pixel where the green filter is formed in the both regions, a B pixel where the blue filter is formed in the both regions, and a pixel where the yellow filter is formed in the transmissive region and the yellow filter and the blue filter are stacked in the reflective region (referred to as Y pixel).

According to the display device of a preferred embodiment of the present invention, the color number of the filters in the transmissive region is different from that in the reflective region, as mentioned above.

That is, the display device is designed in such a way that the color number for the transmissive display is different from that for the reflective display, and thereby a color tone of white balance of display light can be adjusted. Therefore, it can be possible to reduce difference in color tone between the transmissive display and the reflective display.

Other features, elements, steps, advantages and characteristics of the present invention will become more apparent from the following detailed description of preferred embodiments thereof with reference to the attached drawings.

DETAILED DESCRIPTION OF THE PREFERRED EMBODIMENTS

One preferred embodiment of the present invention will now be described.

A liquid crystal display device in accordance with the present preferred embodiment (hereinafter, referred to as "the present display device") is a transflective liquid crystal display device.

That is, according to the present display device, an observer mainly observes transmissive display using light from a backlight under relatively dark environments such as indoor environment. Under relatively bright environments such as outdoor environment, the observer mainly observes reflective display using surrounding light.

The configuration of the present display device is described first.

Figure 1:
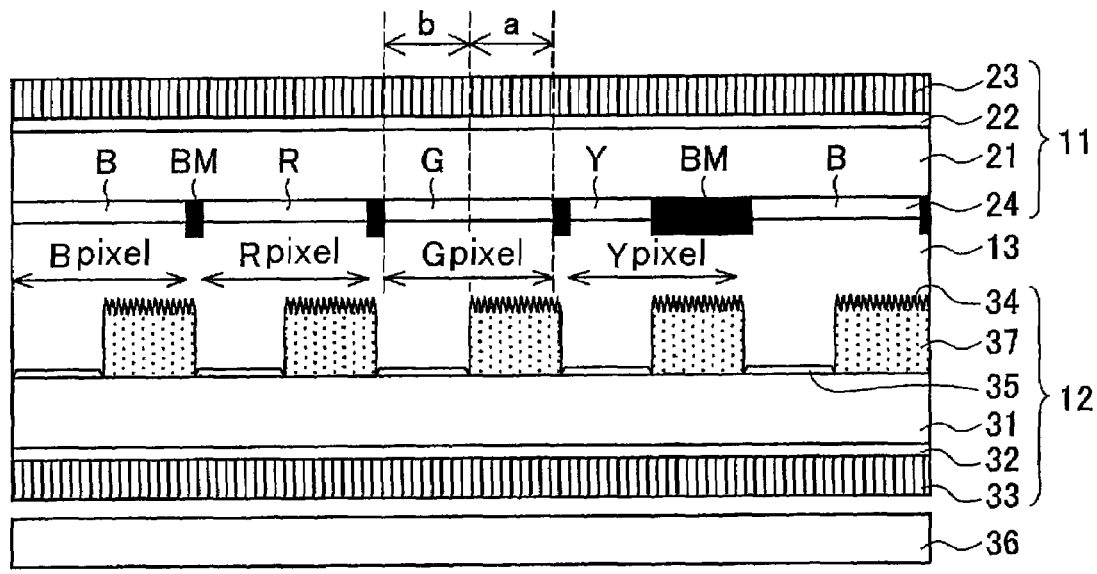
FIG. 1 is an explanation view showing a configuration of a liquid crystal display device in accordance with a preferred embodiment of the present invention.

FIG. 1 is a cross-sectional view showing a schematic configuration of the present display device.

As shown in FIG. 1, the present display device has a configuration in which a liquid crystal layer 13 is interposed between a counter substrate 11 and a pixel substrate 12.

One pixel region in the present display device includes a reflective region a and a transmissive region b in FIG. 1. However, a yellow (Y) pixel region in the present display device includes a transmissive region b and a region where a black matrix (BM) that is a shading member is formed corresponding to a projection 37 and a reflective electrode 34 mentioned below (hereinafter, also referred to as shaded region).

The reflective region a is a pixel region used for the reflective display, and the transmissive region b is a pixel region used for the transmissive display.

The pixels are classified into pixels of four colors (red (R) pixel, blue (B) pixel, green (G) pixel, yellow (Y) pixel) corresponding to filters of four colors (RGBY filters) in a color filter 24 mentioned below.

As shown in FIG. 1, the counter substrate 11 has a configuration in which a retarder 22 and a polarizer 23 are included on the outer side of a glass substrate 21 and on the inner side of the glass substrate 21, the color filter 24 is included. A common electrode made of ITO (Indium Tin Oxide) may be disposed on the inner side of the glass substrate 21, which is not shown in FIG. 1.

The retarder 22 adjusts polarization state of light transmitted therethrough.

The polarizer 23 transmits only light having a specific polarization component.

The color filter 24 selects color of light transmitted therethrough and includes filters of four colors: a red (R) filter; a blue (B) filter; a green (G) filter; and a yellow (Y) filter. The RGBY filters mainly transmit a red component, a blue component, a green component, a yellow component (red and green components) of incident light, respectively.

The RGB filters are arranged one each in the above-mentioned RGB pixels formed by the reflective region a and the transmissive region b. The Y filters are disposed one each in the Y pixel formed by the transmissive region b and the shaded region.

The reflective region a and the transmissive region b in each of the RGB filters are formed to have almost the same size and film thickness. The size and the film thickness of the Y filter are almost the same as those of the RGB filters. However, the size and the film thickness are not necessarily the same. The luminance of each color is changed depending on the size or the film thickness of the filters, and therefore it is preferable that the filters of respective colors are designed in such a way that the white balance is maintained.

Further, a black matrix (BM) is formed between the pixels in the color filter 24.

Particularly, the present display device is designed in such a way that in the Y pixel, the BM is formed at a region where a projection 37 and a reflective electrode 34 mentioned below are formed, thereby the reflective region a is shaded, as shown in FIG. 1.

The pixel substrate 12 has a configuration in which a retarder 32 and a polarizer 33 are included on the outer side of a glass substrate 31 and on the inner side of the glass substrate 31, a projection 37, a reflective electrode 34 also serving as a reflective member, and a transparent electrode 35 are included.

The retarder 32 adjusts polarization state of light transmitted therethrough, as in the retarder 22.

The polarizer 33 transmits only light having a specific polarization component, as in the polarizer 23.

A backlight (external light source) 36 is disposed on the back of the pixel substrate 12 (on the side opposite to the liquid crystal layer 13). The backlight 36 is an LED used in the transmissive display. The reflective electrode 34 is an electrode having a function of reflecting light, and is made of a metal such as Al. The transparent electrode 35 is an electrode made of a transparent conductive material such as ITO.

It may be possible that a reflective member not having functions as an electrode is formed as the reflective electrode 34 and an electrode is additionally formed in a region where the reflective member is disposed. In this case, the reflective member may be formed on the back of the glass substrate 31 (on the side opposite to the liquid crystal layer 13).

The projection 37 is disposed as a lower layer of the reflective electrode 34 in the reflective regions a of the R, G, and B pixels and is a base on which the reflective electrode 34 is formed. Also in the Y pixel, the projection 37 and the reflective electrode 34 are included in the shaded region.

In the present display device, this projection 37 generates a difference in cell thickness between the reflective region a and the transmissive region b.

Next, the white balance of the present display device is described.

The white balance is a hue of white displayed by display devices, and it is one of important display characteristics of display devices.

This white balance is often expressed by a color temperature (color temperature of white display), and 6500 K or more of white balance is needed for devices which display TV images.

According to the present display device, in the transmissive region b, filters of four colors (RGBY filters) are used to display an image, as mentioned above.

Therefore, if a backlight corresponding to a color filter including three colors of RGB is used, the white balance in transmissive display is shifted to yellow and the color temperature is lowered.

Figure 2:
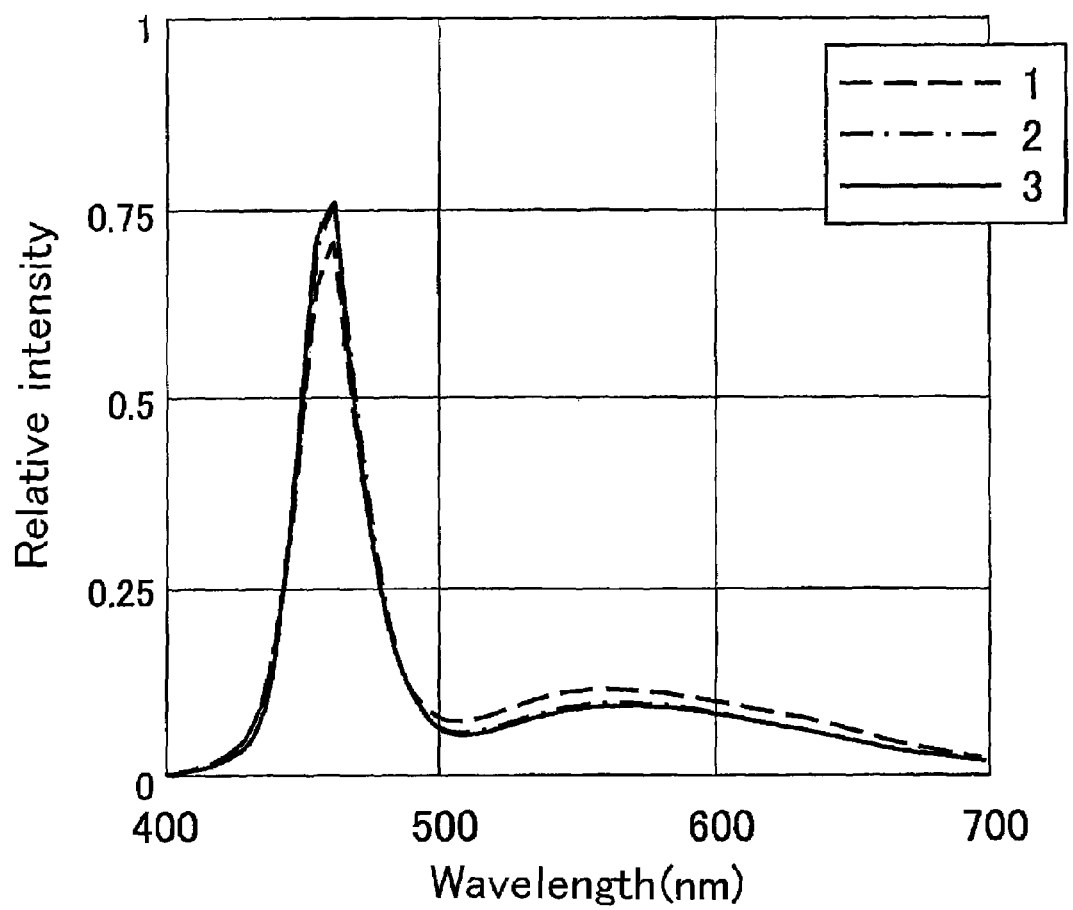
FIG. 2 is a graph showing spectrums of backlights in accordance with the liquid crystal display device.

Therefore, in the present display device, it is preferable that a backlight which has a color temperature higher than that of light of a conventionally used light source corresponding to the three primary colors and emits bluish light is used as the backlight 36 in order to increase the color temperature of the white balance in the transmissive display. FIG. 2 is a graph showing spectrums of the backlights 36.

Lines 1 to 3 in the figure show three different LEDs which can be used as the backlight 36. These LEDs show different blue strengths when the white balance is adjusted. The LED in line 1 shows the weakest blue and the LED in line 3 shows the strongest blue.

In the reflective display, surrounding light is used as a light source and therefore the color temperature of the light source can not be changed. Therefore, the white balance is shifted to yellow, if display is performed using four colors of RGBY filters, but the color reproduction range is extended.

According to the present display device, in the Y pixel, the reflective region a is shaded by the BM, and using the other filters of three colors (RGB filters), the reflection display is performed.

As mentioned above, the backlight having a high color temperature and the filters of four colors are used for the transmissive display, and thereby the white balance can be prevented from shifting to yellow.

According to the present display device, the white balance in the reflective display can be prevented from shifting to yellow by limiting the filters used for the reflective display to the three primary colors of RGB even if the transmissive display is performed using filters of four colors.

In addition, the white balance can be prevented from shifting to yellow in both of the transmissive display and the reflective display by using the backlight having a high color temperature, and therefore excellent display quality can be maintained, according to the present display device.

Then, the color reproduction range of the color filter 24 is mentioned.

A color of light emitted from the color filter 24 is expressed by additive color mixture including four primary colors of RGBY in the transmissive display, or by additive color mixture including three colors of RGB in the reflective display.

If color coordinates of these four primary colors or three primary colors are plotted on an xy chromaticity diagram (an XYZ color system chromaticity diagram according to CIE), the inside of the expressed quadrangle or the inside of the expressed triangle is a color reproduction range of the color filter. The color reproduction range of the color filter depends on an area of the above-mentioned quadrangle or triangle.

Accordingly, the color reproduction range of the color filter depends on strength of the color obtained through the color filter 24.

That is, if the color reproduction range of the color filter is narrow, only faint colors are obtained through the color filter 24.

If the color reproduction range of the color filter is wide, dark colors can be expressed through the color filter 24. That is, the display color also can be diversified. The wider the color reproduction range is, the more the amount of light transmitted through the color filter 24 is limited. That is, the light amount is decreased.

The present display device performs the transmissive display using color filters of four colors, and therefore reduction in light amount is prevented and simultaneously the color reproduction range of the color filter can be extended, in comparison to the case where the transmissive display is performed using the three primary colors.

In the present display device, display light from the reflective region a (hereinafter, also referred to as reflective display light) passes through the color filter 24 twice, and display light from the transmissive region b (hereinafter, also referred to as transmissive display light) passes through the color filter 24 only one time.

Therefore, the color reproduction range in the reflective display is obtained by causing light to enter the color filter twice. In contrast, the color reproduction range in the transmissive display is obtained by causing light to enter the color filter only one time.

As mentioned above, according to the present display device, the number of the color used in the color filter 24 and the number light is transmitted through the color filter 24 are different between the transmissive display and the reflective display.

Accordingly, it is preferable that color adjustment between the color reproduction range in the transmissive display and that in the reflective display is performed. As a result, the color reproduction range in the reflective display can be made equal to that in the reflective display. Such color adjustment can be performed, for example, by forming the color filter 24 to have different thicknesses between the reflective region a and the transmissive region b.

This color adjustment can be also performed by changing the cell thickness.

Figure 3:
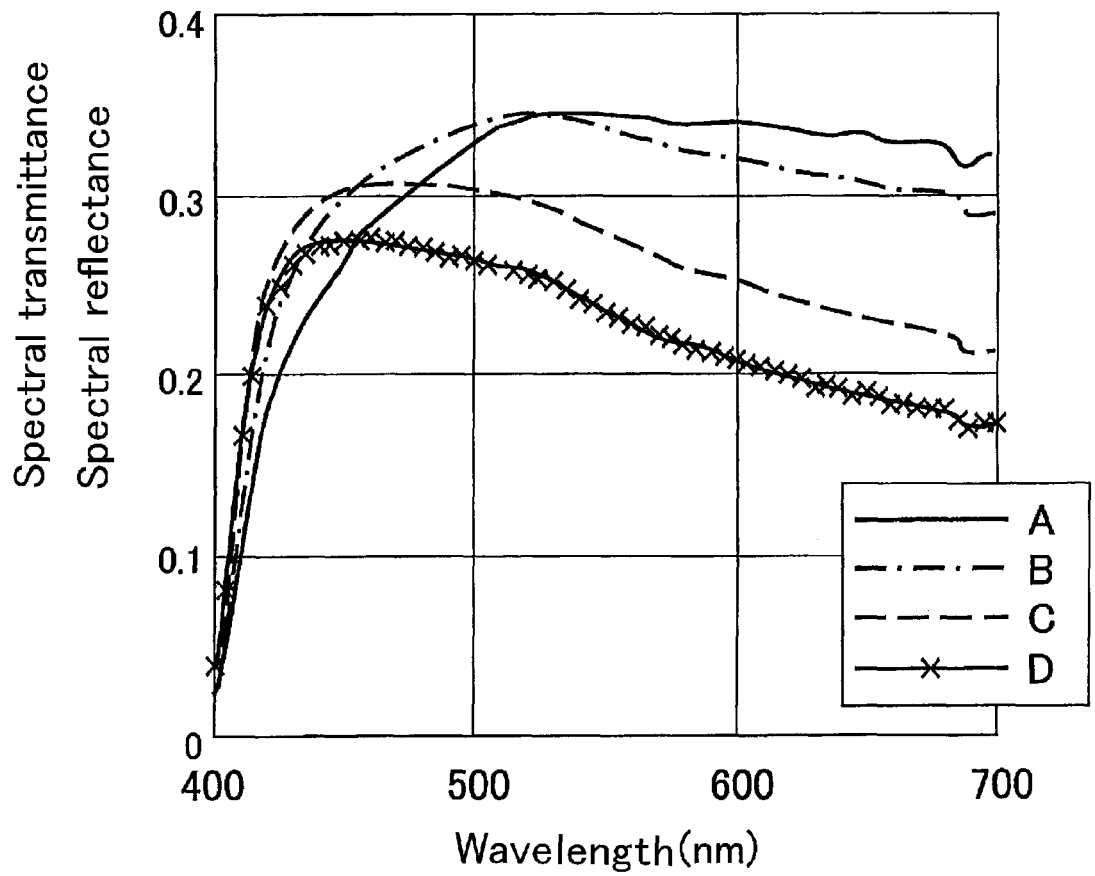
FIG. 3 is a graph showing spectrums of liquid crystal layers in accordance with the liquid crystal display device.
Figure 4:
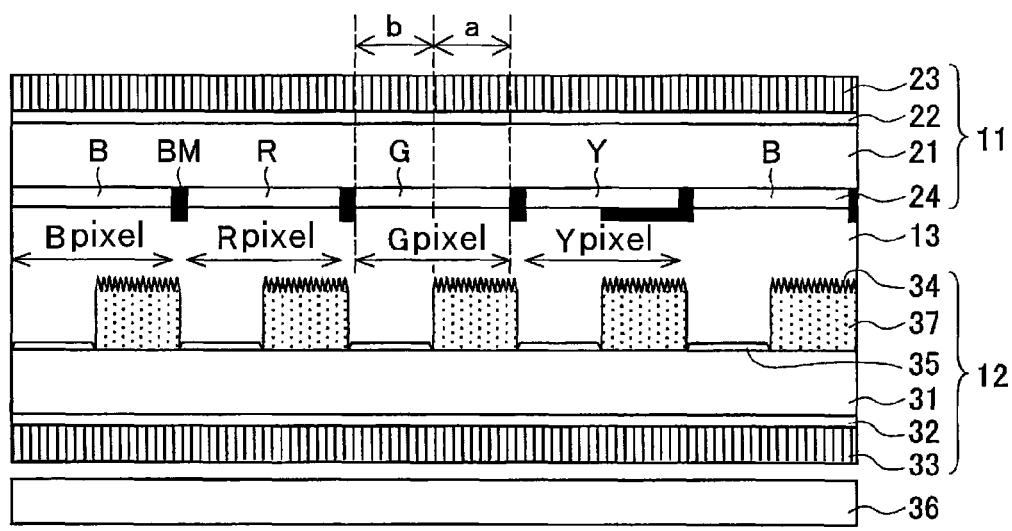
FIG. 4 is an explanation view showing a configuration of a liquid crystal display device in accordance with another preferred embodiment of the present invention.

FIG. 3 is a graph showing measurement results of spectrum transmittance and spectrum reflectance of the liquid crystal layer 13 when nematic liquid crystals having negative dielectric anisotropy and a reflective index anisotropy of about 0.0655 are used as a liquid crystal material. This graph shows measurement results of four liquid crystal layers 13 having different thicknesses. The thickness of the liquid crystal layers 13 is smaller in order of lines A to D. That is, the line A shows the liquid crystal layer 13 having the largest thickness and the line D shows that having the smallest thickness.

The spectral reflectance is a ratio of an amount of light caused to enter the present display device to an amount of light reflected by the reflective region a and emitted as the reflective display light if no color filter is formed.

The spectrum transmittance is a ratio of an amount of light from the backlight 36 to an amount of light transmitted through the transmissive region b and emitted as the transmissive display light.

In the present display device used for this measurement, a λ/4 retarder is used as the retarders 22 and 32. The arrangement and the configuration of the polarizers 23 and 33 and the retarders 22 and 32 are adjusted in such a way that the polarizer 22 and the retarder 23 function together as one circular polarizer (hereinafter, referred to as front polarizer) and that the polarizer 33 and the retarder 32 function together as another circular polarizer (hereinafter, referred to as rear polarizer).

Further, the front polarizer on the counter substrate 11 side and the rear polarizer on the pixel substrate 12 side are disposed to be optically perpendicular to each other.

Liquid crystal molecules of liquid crystal materials of the liquid crystal layer 13 vertically align to the substrates 11 and 12 when no voltage is applied to the electrodes. In this case, the liquid crystal layer 13 does not transmit light externally, and therefore the present display device performs normally black mode display.

As shown in this graph, the spectral transmittance and the spectral reflectance are changed depending on the cell thickness. Accordingly, the color tone of the display light is changed by changing the cell thickness, and thereby the color adjustment can be performed.

Further, the white balance also can be adjusted by changing the color filter, the backlight, or the cell thickness.

According to the configuration in FIG. 1, the BM, instead of the Y filter, is formed in the reflective region in the Y pixel, and thereby this region is shaded, in order to perform reflective display using filters of three primary colors. Alternatively, this region may be shaded by applying another shading material to the Y filter in the shaded region of the Y pixel.

The present display device may have a configuration in which a substantially transparent and colorless resin film T that is an achromatic film is formed at the reflective region a of the Y pixel in the color filter 24.

Figure 9:
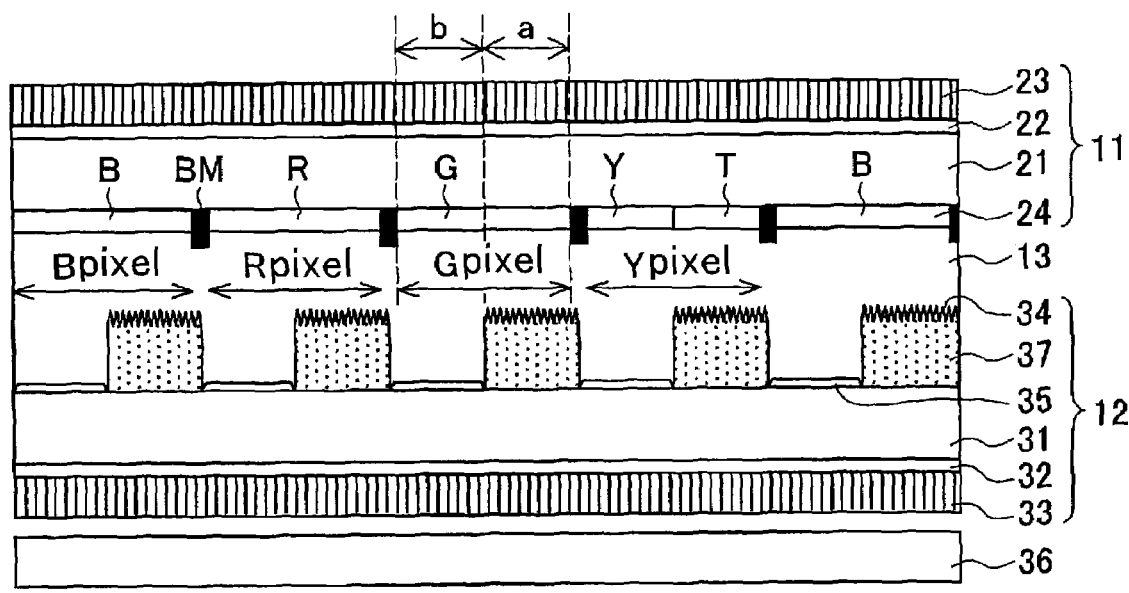
FIG. 9 is an explanation view showing a configuration of a liquid crystal display device in accordance with another preferred embodiment of the present invention.

That is, the present display device may have a configuration shown in FIG. 9, for example. According to this configuration, the Y pixel has the same size as in each of the other RGB pixels and includes the Y filter in the transmissive region b and the substantially transparent and colorless resin film T in the reflective region a.

In this case, use efficiency of light can be improved without changing a hue in the reflective display.

The present display device may have a configuration in which a gray resin film Gy that is an achromatic film is formed in the reflective region a of the Y pixel in the color filter 24.

Figure 10:
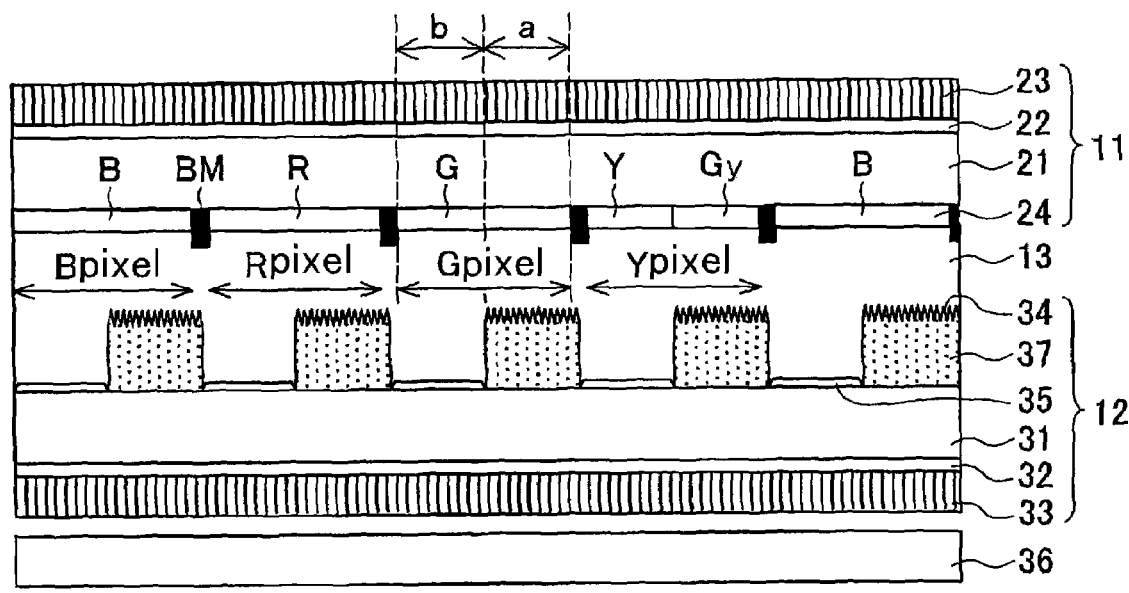
FIG. 10 is an explanation view showing a configuration of a liquid crystal display device in accordance with another preferred embodiment of the present invention.

That is, the present display device may have a configuration shown in FIG. 10, for example. According to this configuration, the Y pixel is designed to have the same size as in each of the other RGB pixels and include the Y filter in the transmissive region b and the gray resin film Gy in the reflective region a.

In this case, use efficiency of light can be improved without changing a hue in the reflective display.

Figure 5:
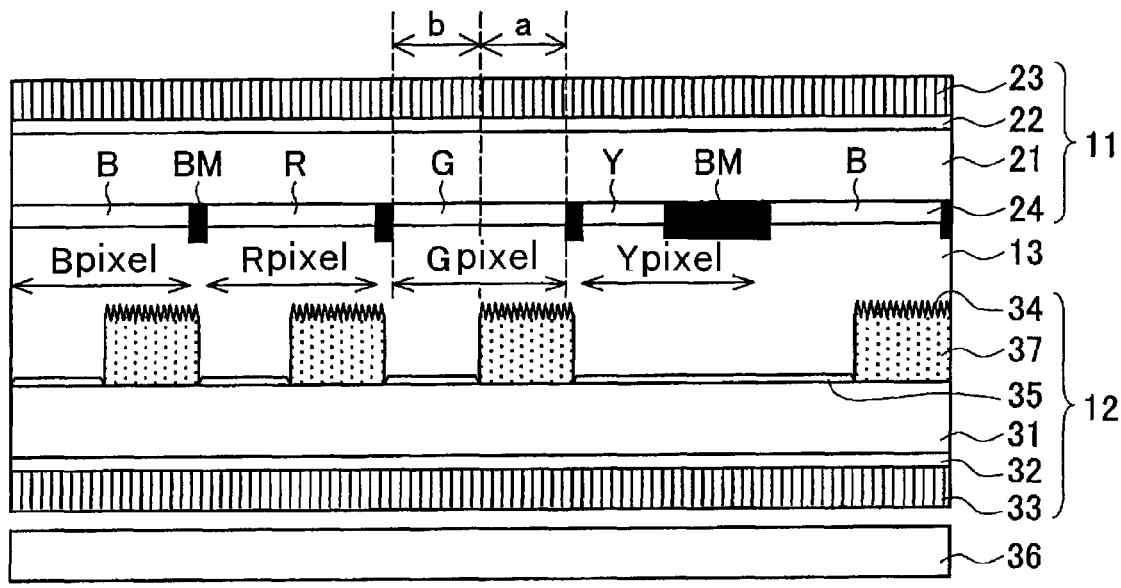
FIG. 5 is an explanation view showing a configuration of a liquid crystal display device in accordance with another preferred embodiment of the present invention.

According to the configuration in FIG. 1, the projection 37 and the reflective electrode 34 are formed in the shaded region of the Y pixel. However, the projection 37 and the reflective electrode 34 may not be formed in the Y pixel, as shown in FIG. 5, because the Y pixel performs no reflective display.

Further, the present display device may have a configuration in which the shaded region is not formed in the Y pixel and the Y pixel may be formed only by the transmissive region b.

Figure 6:
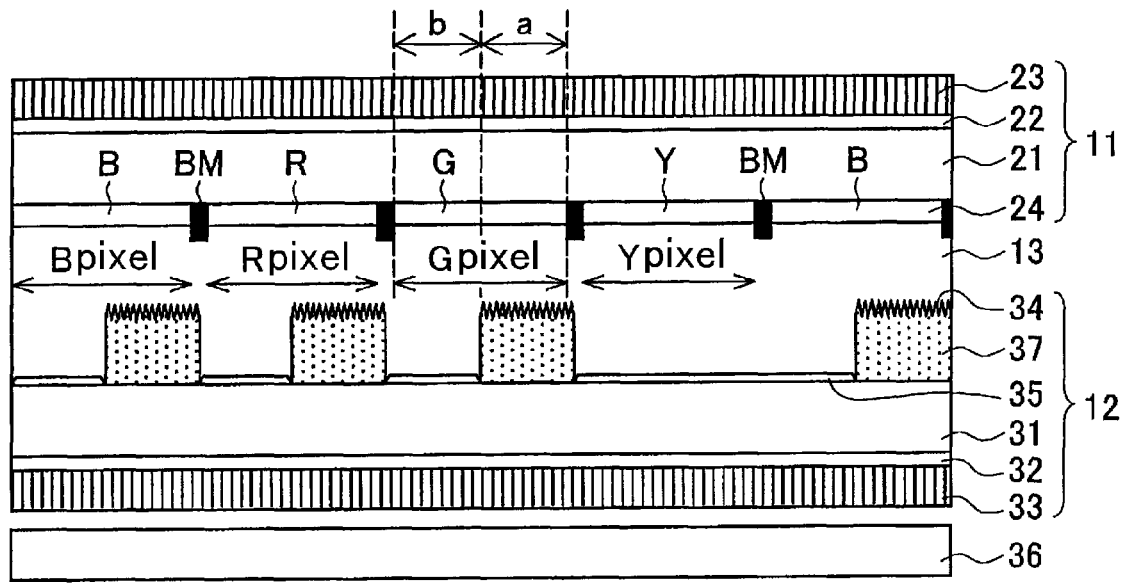
FIG. 6 is an explanation view showing a configuration of a liquid crystal display device in accordance with another preferred embodiment of the present invention.

For example, the present display device may have a configuration shown in FIG. 6. In this configuration, the Y pixel is designed to have only the transmissive region b in the region having the same size as in each of the other RGB pixels. Accordingly, the transmissive region b of the Y pixel is larger than that in each of the other RGB pixels by the shaded region a.

In this case, the part shaded by the BM can be narrow, and therefore use efficiency of light can be improved.

In this configuration, the projection 37 shown in FIG. 1 may be formed inside the transmissive region b of the Y pixel and on this projection 37, the transparent electrode 35 may be formed. This configuration can be easily realized by forming the transparent electrode 35 instead of the reflective electrode 34 in the configuration shown in FIG. 1. However, in a configuration in which no projections 37 are formed, no light is absorbed at the projection 37 made of a resin, and therefore the use efficiency of light can be improved.

In a configuration in which the Y pixel is formed only by the transmissive region b as shown in FIG. 6, the liquid crystal layer 13 is driven to perform reflective display using three pixels of RGB and perform transmissive display using four pixels of RGBY. It is preferable that yellow is displayed by a driving system in which the three pixels of RGY are used in the transmissive regions and two pixels of RG are simultaneously used in the reflective regions, because the transmissive regions and the reflective regions can be driven by the same signal.

Figure 7:
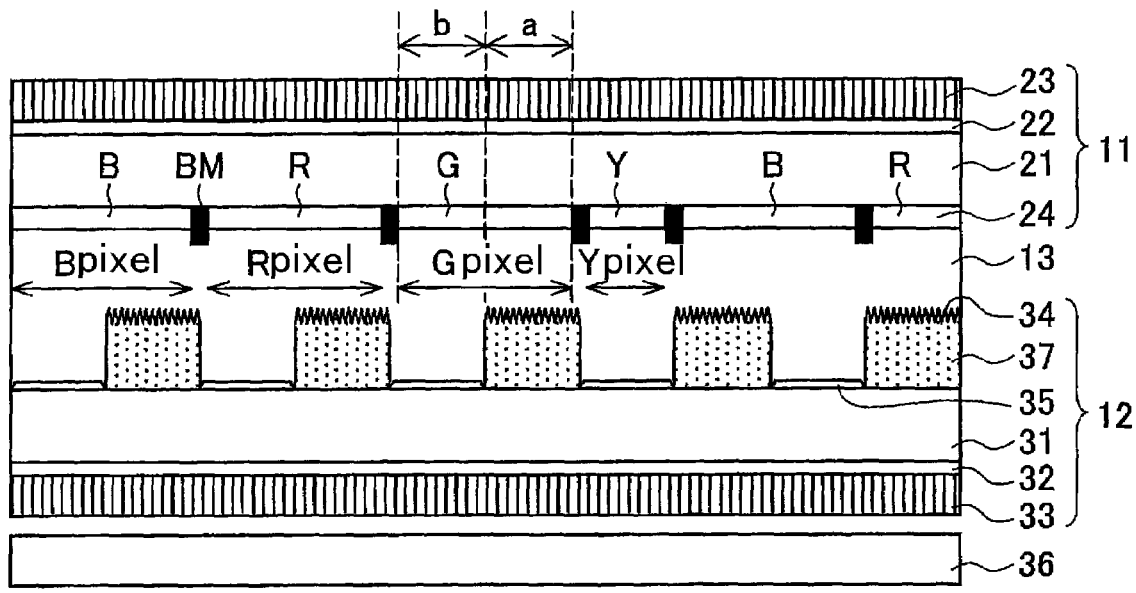
FIG. 7 is an explanation view showing a configuration of a liquid crystal display device in accordance with another preferred embodiment of the present invention.

Further, in the configuration in which the Y pixel is formed only by the transmissive region as shown in FIG. 7, the transmissive region b of the Y pixel may be formed to have the same size as in the transmissive region b of each the other RGB pixels. In this case, the Y pixel is smaller than each of the other RGB pixels by the reflective region a.

In the present preferred embodiment, the color filter 24 is a color filter constituted by four colors of RGBY. Alternatively, the color filter 24 of the present display device may be a five-color color filter including a C (cyan) filter which mainly transmits a cyan component of incident light in addition to the filters of R, G, B, and Y.

Figure 8:
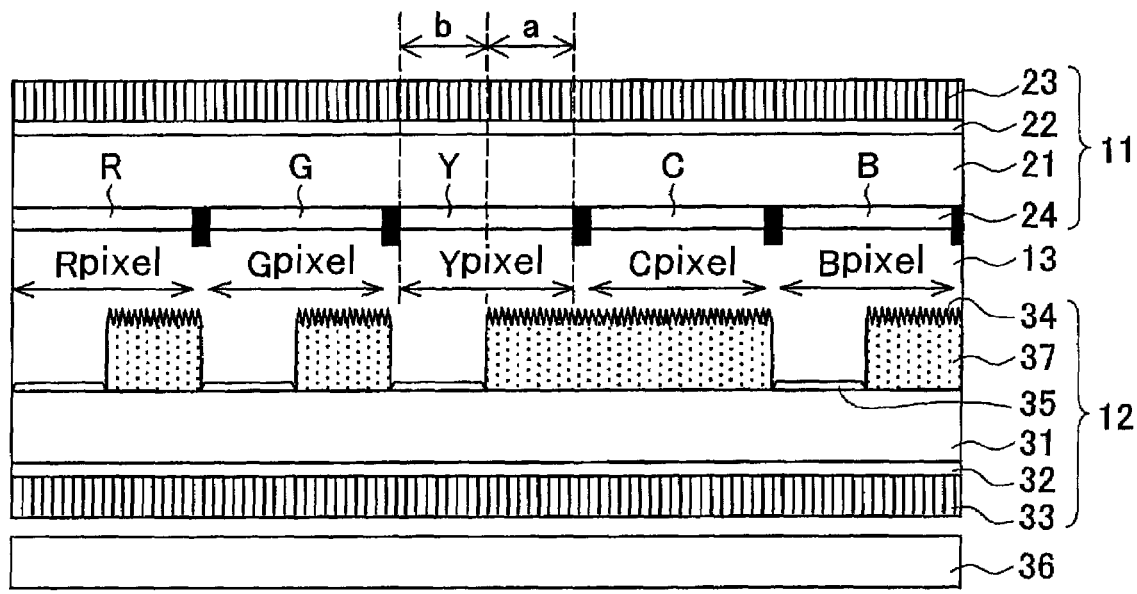
FIG. 8 is an explanation view showing a configuration of a liquid crystal display device in accordance with another preferred embodiment of the present invention.

FIG. 8 is an explanation view showing a configuration of the present display device, including the color filter 24 having filters of R, G, B, Y, and C.

In this configuration, the pixels of the present invention are classified into pixels of five colors (red (R) pixel, blue (B) pixel, green (G) pixel, yellow (Y) pixel, and cyan (C) pixel) corresponding to filters of five colors in the color filter 24.

In addition, in this configuration, the reflective region a and the transmissive region b are formed in each of the RGBY pixels, and the BM is not formed in the Y pixel, as in FIG. 1. In the C pixel, only the reflective region a is formed. That is, the reflective electrode 34 is formed on the entire surface of the C pixel. The pixels are configured to have the same size.

Accordingly, in this configuration, an image is displayed using filters of four colors (filters of R, G, B, and Y) in the transmission display, and using filters of five colors (filters of R, G, B, Y, and C) in the reflective display.

According to this configuration, use of the C filter which transmits a component of blue that is a complementary color of yellow makes it possible for a mixed color of cyan and yellow to display almost white, and thereby the white balance in the reflective display can be prevented from being shifted to yellow. The C filter generally has a luminance higher than that in the R filter and the B filter, and therefore improvements in luminance in the reflective display can be expected.

The reflective display is performed by five-color display using the Y pixel and the C pixel, and therefore the reflective region becomes larger, which can improve the luminance and the color reproduction range in the reflective display.

According to the present preferred embodiment, the filters of R, G, B, Y, and C in the color filter 24 are formed to have almost the same thicknesses. Alternatively, the color reproduction range of the display may be extended by increasing the film thickness of the Y filter or changing the ratio among the RGBYC pixels.

Simulation results of a color temperature of white balance in transmissive display (hereinafter, referred to as transmissive white temperature) and a difference in color temperature of white balance between transmissive display and reflective display (hereinafter, referred to as difference between modes) in the configurations shown in FIGS. 1 and 6 are mentioned below.

Figures 11, 12:
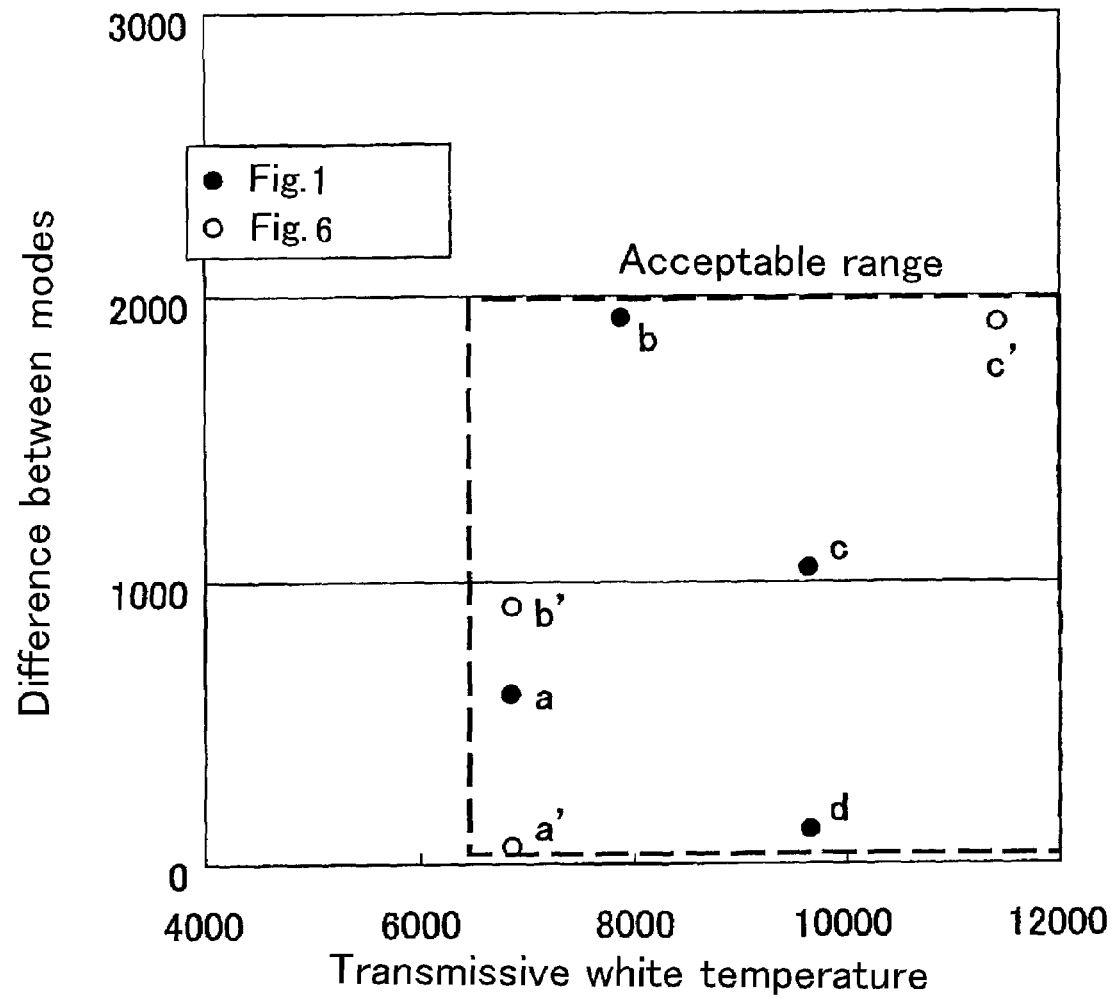
FIG. 11 is a graph showing simulation of transmission white temperature and difference between modes in the liquid crystal display devices shown in FIGS. 1 and 6.
FIG. 12 is an explanation view showing configurations of backlights and liquid crystal materials of the liquid crystal display devices used for the measurement shown in FIG. 11.
Figure 13:
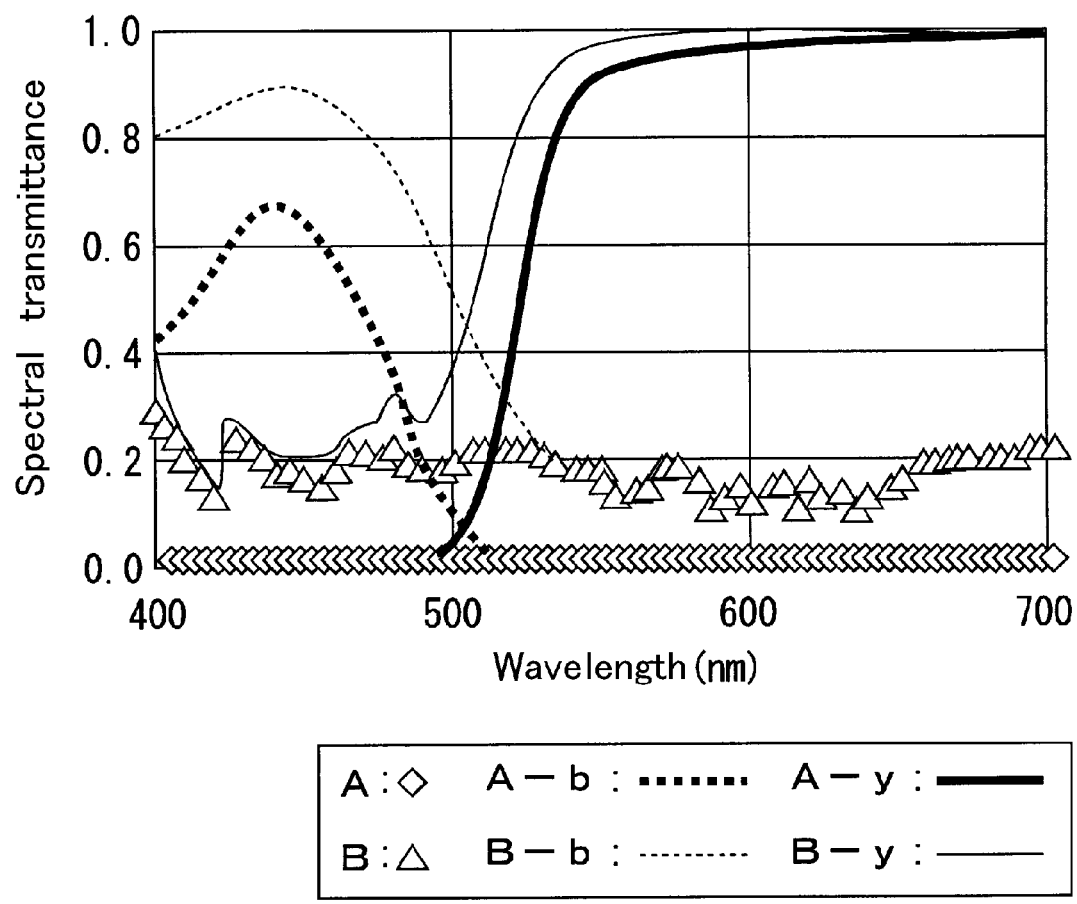
FIG. 13 is a transmission spectrum of light transmitted through a stacked film of a yellow filter and an achromatizing blue filter. "A" in FIG. 13 shows a transmission spectrum of light shaded by a stacked film of a yellow filter showing transmission spectrum A-y and an achromatizing blue filter showing transmission spectrum A-b. "B" in FIG. 13 shows a transmission spectrum of achromatic light transmitted and emitted through a stacked film of a yellow filter showing transmission spectrum B-y and an achromatizing blue filter showing transmission spectrum B-b, and thereby achromatic light is emitted.

FIG. 11 is a graph showing the simulation results.

Display devices including backlights shown in FIG. 12 and liquid crystal materials with a thickness (transmission/reflection) shown in FIG. 12 are used in this measurement. Results of preferred embodiments a to d in which the display device having the configuration in FIG. 1 is used and those of preferred embodiments a' to c' in which the display device having the configuration in FIG. 6 is used, are shown.

The A to D shown in the "liquid crystal material" column in FIG. 12 correspond to thicknesses shown in lines A to D in FIG. 3, respectively. For example, if the "transmission/reflection" is A/A, a cell thickness in the transmissive region b and that in the reflective region a both correspond to the line A.

The reflective region a and the transmissive region b have different cell thicknesses, actually, because of the presence of the projection 37. In addition, display light is transmitted through the liquid crystal layer 13 twice in the reflective region a, but in the transmissive region b, the display light is transmitted through the liquid crystal layer 13 only one time. That is, "cell thickness" shown in FIG. 12 is a length of optical light path inside the liquid crystal layer 13 in the transmissive region b and the reflective region a. Accordingly, if the "transmission/reflection" is A/A, the cell thickness of the transmissive region b is set to be twice as large as that in the reflective region a.

The data on "transmission/reflection" in the configuration in FIG. 6 relates to the RGB pixels except for the Y pixel.

In this measurement, xy chromaticity coordinates (0.313, 0.329) of D65 standard light source are defined as standard white chromaticity.

Excellent display quality in the transmissive display and the reflective display can be maintained if a transmissive white temperature is from 6500 K to 12000 K, and a reflective white temperature is from 5000 K to 12000 K, and a difference between the modes is 2000 K or less, generally.

As shown in FIG. 11, the transmissive white temperature, the reflective white temperature, and the difference between the modes are all within the above-mentioned ranges (acceptable ranges) in preferred embodiments a to d and a' to c' in the present display device. Such results show that excellent display can be performed in these preferred embodiments.

In order to perform more excellent display, it is preferable that the white balance in the transmissive display is from 8000 K to 10000 K, and the difference between the modes is 1000 K or less. Accordingly, preferred embodiment d in the configuration in FIG. 1 is the most preferable among the preferred embodiments used in this measurement.

The above-mentioned color temperature can be calculated from the following formula based on chromaticity coordinates (x, y) in an XYZ color system according to CIE (refer to Non-patent Document 1).

$$T = -437n^3 + 3601n^2 - 6861n + 5514.31$$

T is a correlation color temperature, n=(x−0.3320)/(y−0.1858)

With respect to the present display device, it is preferable that conditions such as spectral radiance of the backlight 36, the cell thickness, and the film thickness or the pixel ratio in the pixels of the color filter are adjusted in order to set the transmission white temperature and the difference between the modes to be within the above-mentioned acceptable ranges.

According to the present preferred embodiment, the backlight 36 is constituted by an LED. Alternatively, the backlight 36 may be constituted by a CCFT (cold cathode fluorescent tube) or a HCFT (hot cathode fluorescent tube), or may be a hybrid of an LED and a CCFT, or a hybrid of an LED and a HCFT.

Further, according to the present display device, the reflective display and the transmissive display are simultaneously displayed and two images of a reflective image and a transmissive image are simultaneously observed. Therefore, an observer actually observes a mixture of these two images. An image to be observed depends on which display is dominant. For example, in the configuration shown in FIG. 1, an image mainly displayed by RGBY is observed if the transmissive display is dominant, and an image mainly displayed by RGB is observed if the reflective display is dominant. This is applied to all colors. The color tone is different between the transmissive display and the reflective display, but the luminance in the display which is not dominant is small and hardly influences the dominant display.

In the RGBY pixels, the luminance of each color is lower than that of an image constituted by three colors of RGB. Therefore, it is preferable that the luminance and the chromaticity are adjusted by lighting Y, when RG pixels are lighted. The luminance is different between a display by only RG pixels using the three colors of RGB and that using four colors of RGBY when the same RG signals are input and therefore it is preferable to adjust the luminance by lighting Y.

According to the present preferred embodiment, the present display device is a liquid crystal display device. Alternatively, the present display device may be configured as a display device in another system. That is, the present display device can be applied to display devices in any systems as long as it is a display device in which display is performed using a color filter having multi-colors in both of the reflection mode and the transmission mode.

The configuration of the present display device can be applied, for example, to an organic EL display called a self-emitting display, which performs display as a hybrid with a liquid crystal display device using different filters between a transmissive region and a reflective region.

According to the present preferred embodiment, the present display device is a transflective display device in which the transmissive display using light of a backlight is dominant in a dark environment and the reflective display using surrounding light is dominant in a bright environment. Alternatively, the present display device may be configured to select either of the reflective display or the transmissive display depending on surrounding light intensity and switch the liquid crystal driving system for each selected pixel.

According to the present preferred embodiment, the white balance in the transmissive display can be made equal to that in the reflective display, in the present display device. In addition, it can be possible to reduce difference in color tone, due to other causes, if the color number of the filters in the color filter 24 of the present display device is different between the transmissive region and the reflective region.

That is, the color number of the filters used in the transmissive display is not the same as that used in the reflective region. As a result, a color tone of display light can be adjusted, and therefore such a difference in color tone can be reduced in the case where the color tone of the display is different between the transmissive display and the reflective display if filters of the same color are used in the both displays.

Preferably, it is appropriately determined in which modes, transmission or reflection, the color number is large, or how many color filters each of the transmission or the reflection has, because it depends on properties of a color tone to be adjusted.

That is, the color number in the transmission may be larger than that in the reflection, or may be smaller than that in the reflection.

This Non-provisional application claims priority (under 35 U.S.C. §119) on Patent Application No. 2005-109226 filed in Japan on Apr. 5, 2005 and Patent Application No. 2005-373539 filed in Japan on Dec. 26, 2005, the entire contents of which are hereby incorporated by reference.

The terms "or more" and "or less" in the present description mean that the value described is included. That is, the term "or more" means the described value and values more than the described value.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A transflective display device comprising: transmissive regions displaying an image by transmitting light of a backlight; reflective regions displaying an image by reflecting surrounding light; and a color filter including a plurality of different filters having different colors being arranged in both the transmissive regions and the reflective regions; wherein a number of the different colors of the different filters in the transmissive regions is different from a number of the different colors of the different filters in the reflective regions; wherein the color number of the filters in the transmissive regions is larger than the color number of the filters in the reflective regions.

2. The transflective display device according to claim 1, wherein the color number of the filters in the transmissive regions is 4 and the color number of the filters in the reflective regions is 3.

3. The transflective display device according to claim 2, wherein the filters in the transmissive regions include a red filter, a green filter, a blue filter, and a yellow filter; and the filters in the reflective regions are a red filter, a green filter, and a blue filter.

4. A transflective display device comprising:
transmissive regions displaying an image by transmitting light of a backlight;
reflective regions displaying an image by reflecting surrounding light; and
a color filter including filters of a plurality of colors;
wherein the filters in the transmissive regions include a red filter, a green filter, a blue filter, and a yellow filter;
the filters in the reflective regions include a red filter, a green filter, and a blue filter; and
in a pixel including the yellow filter in the transmissive region, a reflective member arranged to reflect surrounding light is not formed.

5. A transflective display device arranged to perform transmissive display to display an image by transmitting light of a backlight and to perform reflective display to display an image by reflecting surrounding light, the transflective display device comprising: a color filter including a plurality of different filters having different colors being arranged in both a transmissive display area and a reflective display area; wherein a number of the different colors of the different filters used for the transmissive display area is different from a number of the different colors of the different filters used for the reflective display area; wherein the color number of the filters used for the transmissive display area is larger than the color number of the filters used for the reflective display area.

6. The transflective display device according to claim 5, wherein the filters used for the transmissive display area include a red filter, a green filter, a blue filter, and a yellow filter; and the filters used for the reflective display area are a red filter, a green filter, and a blue filter.

* * * * *